No. 691,529. Patented Jan. 21, 1902.
M. M. BROPHY.
FILTERING AND REGULATING DEVICE.
(Application filed Sept. 12, 1901.)

(No Model.)

Witnesses:

Inventor:

UNITED STATES PATENT OFFICE.

MICHAEL MARY BROPHY, OF LONDON, ENGLAND.

FILTERING AND REGULATING DEVICE.

SPECIFICATION forming part of Letters Patent No. 691,529, dated January 21, 1902.

Application filed September 12, 1901. Serial No. 75,190. (No model.)

*To all whom it may concern:*

Be it known that I, MICHAEL MARY BROPHY, a subject of the King of Great Britain, residing at 251 High Holborn, London, England, have invented a new and useful Apparatus for Regulating the Flow of and Separating Mechanical Impurities from Water, Steam, and other Fluids, of which the following is a specification.

My invention relates to an apparatus designed for regulating the flow of water, steam, or other fluids and for separating from such fluids any mechanical impurities carried thereby, the said apparatus being especially applicable for use in connection with the hot and cold water fitting described in the specification of my former application, Serial No. 52,198, filed March 21, 1901, for accurately controlling the flow of water and steam to the mixing-chamber of such fitting and for preventing dirt or grit from being carried to the seats of the draw-off valves.

Hitherto I have used separate devices—namely, an ordinary cock—for regulating the flow and a separator—such, for instance, as that forming the subject of my former patent, No. 675,711.

According to my present invention I provide a combined regulator and separator which is easily operated and which can be readily cleaned when necessary.

In carrying my invention into practice I provide a hollow plug which is inserted into and adapted to work within a sleeve or socket, which socket is itself inserted into a suitable casing or shell. The said socket and plug are formed with corresponding apertures in such a manner that by placing the said apertures more or less out of coincidence the desired control of the flow will be effected. The plug is provided with a shank or stem which projects through a boss on the outer end of the socket and is also screw-threaded for carrying a lock-nut, by means of which the plug may be fixed in any desired position relatively with the socket, the outer end of the shank of the plug being made square or of other suitable shape to admit of the application of a regulating-key. The separator consists of wire-gauze or the like, which is inserted in the hollow plug, so that the fluid which in its passage through the apparatus flows from the inside of the plug outward through the socket will in passing through the gauze deposit any mechanical impurities which it carries.

To enable my invention to be fully understood, I will describe the same by reference to the accompanying drawings, in which—

Figure 1:
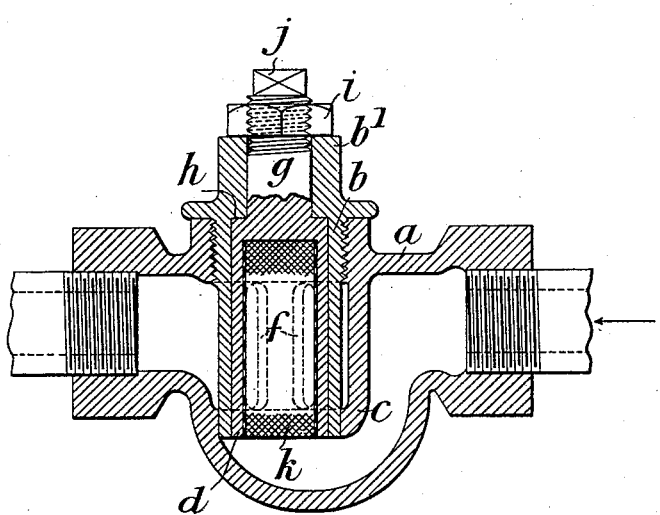
Figure 2:
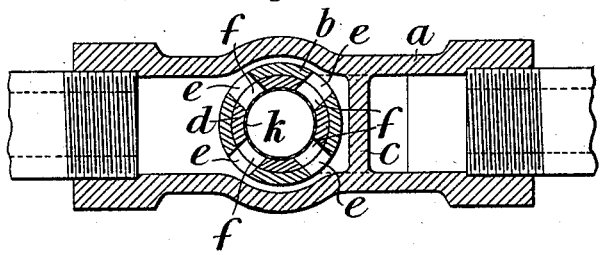

Figure 1 is a sectional elevation, and Fig. 2 is a horizontal section, of my combined regulator and separator.

$a$ is the shell or casing of the device, and $b$ is the socket, which is screwed into an aperture in the said shell and with its lower end fitting into a corresponding aperture in a partition $c$ in the casing, the said socket at its outer end being formed with a boss $b'$, having flat surfaces to allow of the application of a spanner.

$d$ is the hollow plug which is fitted into the said socket, and $e\ e\ e\ e$ and $f\ f\ f\ f$ are the two sets of apertures formed in the socket and plug, respectively. As shown in the drawings, the said two sets of apertures are placed in coincidence. It will be obvious, however, that when the plug $d$ is turned more or less relatively to the socket $b$ the passage through the apertures will be more or less contracted.

$g$ is the shank of the plug which extends through the boss $b'$ on the socket, the said shank being of smaller diameter than the external diameter of the plug, so as to form a shoulder $h$, which will seat against a corresponding shoulder on the boss $b'$.

$i$ is a lock-nut which is screwed onto the shank $g$, which is screw-threaded for a portion of its length, and the tightening of which nut, by drawing the shoulder $h$ against a corresponding shoulder in the boss $b'$, serves to form a tight joint and at the same time prevent the plug $d$ from being inadvertently moved after its position has been adjusted.

$j$ is a polygonal head formed upon the shank $g$ and serving for the application of a key or spanner for adjusting the position of the plug $d$ prior to being fixed by means of the lock-nut $i$.

$k$ is the gauze filter, which is placed inside the hollow plug $d$ in the manner described in the specification of my former patent, No. 675,711.

It will be obvious that in order to cleanse the filtering-surface it will not be necessary to alter the position of the plug relatively with the socket, but only to unscrew the socket from the shell and to replace it after the filter has been cleansed.

Having now particularly described and ascertained the nature of my said invention and in what manner the same is to be performed, I declare that what I claim is—

1. In a combined fluid-regulator and dirt-separator, the combination with the casing, of a removable sleeve adapted to be rigidly secured therein, and provided with apertures, a hollow plug rotatably mounted in said sleeve, provided with apertures adapted to register with those of said sleeve and having a part extending outside of the casing to permit said plug to be turned in said sleeve, a screen located in said plug, and devices for locking said plug in its adjusted position with respect to said sleeve, whereby said sleeve can be removed with said plug for cleaning, without disturbing the adjustment of said plug, substantially as described.

2. In a combined fluid-regulator and dirt-separator, the combination with the casing provided with a partition having an aperture therein, of a removable casing adapted to be rigidly secured in said casing and having one end engaging the aperture in said partition, said sleeve being provided with apertures, a hollow plug rotatably mounted in said sleeve, and having a stem extending outside the casing, said plug being provided with apertures adapted to register with those of the sleeve, a cylindrical screen located within said plug, adjacent to the apertures therein, and a jam-nut on said stem for locking the plug and sleeve with respect to each other, whereby the sleeve can be removed, with the plug for cleaning without affecting the adjustment of said parts, substantially as described.

MICHAEL MARY BROPHY.

Witnesses:
JOHN E. BOUSFIELD,
C. G. REDFERN.